United States Patent
Seem et al.

(10) Patent No.: US 7,031,880 B1
(45) Date of Patent: Apr. 18, 2006

(54) METHOD AND APPARATUS FOR ASSESSING PERFORMANCE OF AN ENVIRONMENTAL CONTROL SYSTEM

(75) Inventors: John E. Seem, Glendale, WI (US); William A. Huth, Hartland, WI (US); Robert J. Fraune, Waukesha, WI (US); Anita M. Lewis, Cedarburg, WI (US); Tri V. Ky, Waukesha, WI (US)

(73) Assignee: Johnson Controls Technology Company, Holland, MI (US)

( * ) Notice: Subject to any disclaimer, the term of this patent is extended or adjusted under 35 U.S.C. 154(b) by 46 days.

(21) Appl. No.: 10/841,107

(22) Filed: May 7, 2004

(51) Int. Cl.
*G06F 19/00* (2006.01)

(52) U.S. Cl. .................. 702/182; 700/32; 700/174; 700/276

(58) Field of Classification Search .............. None
See application file for complete search history.

(56) References Cited

U.S. PATENT DOCUMENTS

| | | | | |
|---|---|---|---|---|
| 5,446,677 A * | 8/1995 | Jensen et al. | ............. | 700/277 |
| 5,555,195 A | 9/1996 | Jensen et al. | | |
| 5,682,329 A | 10/1997 | Seem et al. | | |
| 5,973,662 A * | 10/1999 | Singers et al. | ............. | 345/418 |
| 6,014,612 A * | 1/2000 | Larson et al. | ............. | 702/183 |
| 6,031,547 A * | 2/2000 | Kennedy | ............. | 345/440 |
| 6,134,511 A * | 10/2000 | Subbarao | ............. | 703/6 |
| 6,285,966 B1 * | 9/2001 | Brown et al. | ............. | 702/188 |
| 6,363,422 B1 * | 3/2002 | Hunter et al. | ............. | 709/224 |
| 6,385,510 B1 * | 5/2002 | Hoog et al. | ............. | 700/276 |
| 6,389,331 B1 * | 5/2002 | Jensen et al. | ............. | 700/275 |
| 6,437,691 B1 * | 8/2002 | Sandelman et al. | ............. | 340/506 |
| 6,477,518 B1 * | 11/2002 | Li et al. | ............. | 706/45 |
| 6,577,323 B1 * | 6/2003 | Jamieson et al. | ............. | 715/700 |
| 6,626,366 B1 * | 9/2003 | Kayahara et al. | ............. | 236/94 |
| 6,646,660 B1 * | 11/2003 | Patty | ............. | 700/108 |
| 6,704,016 B1 * | 3/2004 | Oliver et al. | ............. | 345/440.2 |
| 6,732,540 B1 * | 5/2004 | Sugihara et al. | ............. | 62/177 |
| 6,764,019 B1 * | 7/2004 | Kayahara et al. | ............. | 236/51 |
| 6,782,385 B1 * | 8/2004 | Natsumeda et al. | ............. | 707/6 |
| 6,813,532 B1 * | 11/2004 | Eryurek et al. | ............. | 700/108 |
| 6,816,811 B1 * | 11/2004 | Seem | ............. | 702/179 |
| 6,823,680 B1 * | 11/2004 | Jayanth | ............. | 62/127 |
| 6,826,454 B1 * | 11/2004 | Sulfstede | ............. | 700/276 |
| 6,865,511 B1 * | 3/2005 | Frerichs et al. | ............. | 702/182 |
| 6,925,338 B1 * | 8/2005 | Eryurek et al. | ............. | 700/30 |

(Continued)

*Primary Examiner*—Patrick J. Assouad
(74) *Attorney, Agent, or Firm*—Foley & Lardner LLP

(57) ABSTRACT

A method and apparatus is disclosed for assessing performance of control applications in an environmental control network and for diagnosing performance problems. The apparatus includes a performance assessment and diagnostic display comprising a facility navigation tree, a system navigation tree and a performance/diagnostics window. The facility navigation tree and system navigation tree may be used to select the facilities and systems that are to have their associated control applications assessed and/or diagnosed. The performance/diagnostics window includes graphs of performance indictors that are indicative of performance levels for the included control applications. The system tree may be used to delve to more detailed views of the performance indicators to obtain additional information that may help to diagnose problems noted in performance of the selected control applications.

58 Claims, 13 Drawing Sheets

U.S. PATENT DOCUMENTS

| | | | |
|---|---|---|---|
| 2002/0010562 A1* | 1/2002 | Schleiss et al. | 702/183 |
| 2002/0059229 A1* | 5/2002 | Natsumeda et al. | 707/6 |
| 2002/0147506 A1* | 10/2002 | Eryurek et al. | 700/28 |
| 2002/0177909 A1* | 11/2002 | Fu et al. | 700/28 |
| 2003/0014130 A1* | 1/2003 | Grumelart | 700/28 |
| 2003/0158704 A1* | 8/2003 | Triginai et al. | 702/182 |
| 2004/0068390 A1* | 4/2004 | Saunders | 702/182 |
| 2004/0133314 A1* | 7/2004 | Ehlers et al. | 700/276 |
| 2004/0199360 A1* | 10/2004 | Friman et al. | 702/182 |

* cited by examiner

METHOD AND APPARATUS FOR ASSESSING PERFORMANCE OF AN ENVIRONMENTAL CONTROL SYSTEM

FIELD OF THE INVENTION

The present invention relates to an environmental control system. More particularly, the present invention relates to a method and apparatus for assessing performance of environmental control networks. The present invention also relates to a method and apparatus for diagnosing performance problems in environmental control networks.

BACKGROUND OF THE INVENTION

Environmental control networks or facility management systems are employed in office buildings, manufacturing facilities, and the like, for controlling the internal environment of the facility. The environmental control network may be employed to control temperature, fluid flow, humidity, lighting, boilers, chillers, power, security and similar systems in the internal environment.

For example, in environmental control networks configured to control temperature and air flow, controlled air units such as variable air volume (VAV) boxes and unitary devices (UNT) are located throughout the facility to provide environmentally controlled air to the internal environment. The controlled air is provided at a particular temperature or humidity so that a comfortable internal environment is established and maintained.

The VAV boxes and unitary devices are coupled via duct work to a source of conditioned air, known as an air handling unit (AHU). VAV boxes and unitary devices may include a fan or other device for blowing the controlled air. VAV boxes and unitary devices may also include a damper for regulating the amount of the controlled air provided to the internal environment. The damper is coupled to an actuator, which preferably positions the damper so that appropriate air flow is provided to the internal environment.

In modern systems, a digital controller is typically associated with at least one of the actuator and the damper. The controller receives information related to the air flow and temperature (known as "controlled variables") in the internal environment and appropriately positions the actuator so that the appropriate air flow is provided to the internal environment.

The AHU also includes a digital controller which may control the supply of cooled air by regulating the flow of chilled water through a cooling coil. The controller regulates the flow of chilled water to the cooling coil by adjusting the position of a valve based on a feedback signal indicative of the temperature of the air discharged from the coil (another "controlled variable"). The feedback signal is generated by a sensor disposed to monitor the controlled variable.

The AHU and VAV controllers use the feedback signals to maintain the controlled variables within certain tolerances of desired levels (known as "setpoints"). For example, the AHU controller attempts to maintain the temperature of the air discharged from the system at a specific level. When the actual temperature of the discharged air deviates from the desired temperature, the controller must appropriately adjust the flow of the chilled water to bring the actual air temperature back in line with the desired air temperature. Thus, if the feedback signal indicates that the actual air temperature is colder than the desired temperature, the controller decreases the flow rate of chilled water to cause the actual temperature of the discharged air to increase. Likewise, if the feedback signal indicates that the actual air temperature is warmer than the desired temperature, the controller increases the flow rate of chilled water to cause the actual temperature of the discharged air to decrease.

An ideal feedback control system would be able to maintain the controlled variable at the setpoint based only on the feedback signal. However, actual feedback control systems require additional inputs known as control parameters that are used by the controller to determine how to control the system based on the feedback signal and the setpoint. Common control algorithms that make use of such control parameters are proportional (P) control, proportional integral (PI) control, and proportional-integral derivative (PID) control. More recently, a pattern recognition adaptive control (PRAC) method has been utilized to automatically determine the values of the control parameters after significant setpoint changes or load disturbances have occurred. One example of an improved PRAC method is disclosed in commonly owned U.S. patent application Ser. No. 10/612,621 (now U.S. Pat. No. 6,937,909).

With any of the forgoing feedback control strategies, however, it can be difficult to maintain the controlled variable precisely at the desired set point for various reasons, including that the appropriate values for the control parameters may change over time as the system is used. For example, the dynamics of a process may be altered by heat exchanger fouling, inherent nonlinear behavior, ambient variations, flow rate changes, large and frequent disturbances, and unusual operations status such as failures, startup and shutdown. The process of adjusting the control parameters of a controller to compensate for such system changes is called retuning. If a controller is not periodically retuned, the control response may become poor. For example, the controlled variable may become unstable or oscillate widely with respect to the setpoint. This can result in inefficient operation as well as increase the maintenance costs due to unnecessary wear of the components.

Significant advances in the art of monitoring the performance of environmental control systems and diagnosing problems therewith have been disclosed in commonly owned U.S. Pat. Nos. 5,555,195 and 5,682,329 ("the '195 and '329 patents"), the entire contents of which are hereby incorporated by reference herein. The '195 and '329 patents disclose diagnostic systems that may be utilized to analyze the performance of devices in an environmental control system such as an HVAC or VAV box. The diagnostic systems disclosed in these two patents advantageously record temperature, air flow, actuator position and other data used in the VAV controllers and generate associated performance indices such as exponentially weighted moving averages (EWMAs). The performance indices may be related to error values, process output values, actuator positions, changes in actuator positions, duty cycles of the actuators, or starts, stops and reversals of the actuators. The calculated and stored performance indices allow building operators to analyze the VAV boxes and controller performance during particular time periods (e.g., commissioning) as well as during the useful lifetimes of the systems.

In addition to monitoring and diagnostic systems such as described above, it is also known to provide alarm/warning systems and data visualization programs to assist building operators with deriving meaningful information from the data that is gathered. However, human operators must typically select the thresholds for alarms and warnings, which can be a daunting task. If the thresholds are too tight, numerous false alarms may be issued. Conversely, if the thresholds are too loose, equipment or system failures can go undetected.

In view of the forgoing, it would be desirable to provide an improved method and apparatus for conveying measured performance indices to building operators. It would be further be desirable to convey performance indicators to building operators for analyzing system performance and diagnosing problems without requiring manual setting of alarm and warning thresholds.

SUMMARY OF THE INVENTION

The present invention relates to a method and apparatus for assessing performance of an environmental control network. The present invention also relates to a method and apparatus for diagnosing performance problems in environmental control networks.

According to a first aspect of an embodiment of the present invention, a method is provided for analyzing performance of control applications in an environmental control network. The method includes receiving at least one performance indicator for each control application, and identifying at least one control application experiencing degraded performance using a first view of the performance indicators. The method further includes obtaining additional information regarding the at least one control application using a second view of the performance indicators.

According to another aspect of an embodiment of the present invention, a program product is provided for analyzing performance of control applications in an environmental control network. The program product comprises machine-readable program code for causing, when executed, one or more machines to implement a method. The method includes displaying performance indicators for the control applications using a first view that allows at least one control application exhibiting degraded performance to be identified. The method further includes displaying performance indicators using a second view that provides additional details regarding the performance of the at least one control application.

According to another aspect of an embodiment of the present invention, a method is provided for diagnosing performance of control applications in an environmental control network. The method includes receiving at least one performance indicator for each control application, and identifying at least one control application exhibiting degraded performance using a first view of the performance indicators. The method further includes obtaining additional information regarding the at least one control application using a second view of the performance indicators. The second view provides additional information on the at least one control application to permit a diagnosis of a possible cause of the degraded performance.

According to another aspect of an embodiment of the present invention, a method is provided for assessing performance of control applications associated with an environmental control network. The method includes receiving a plurality of performance indicators for the control applications, and performing a statistical scaling on the performance indicators. The method further includes displaying the scaled performance indicators on a common scale.

These and other benefits and features of embodiments of the invention will be apparent upon consideration of the following detailed description of exemplary embodiments thereof, presented in connection with the following drawings in which like reference numerals are used to identify like elements throughout.

Figure 1:
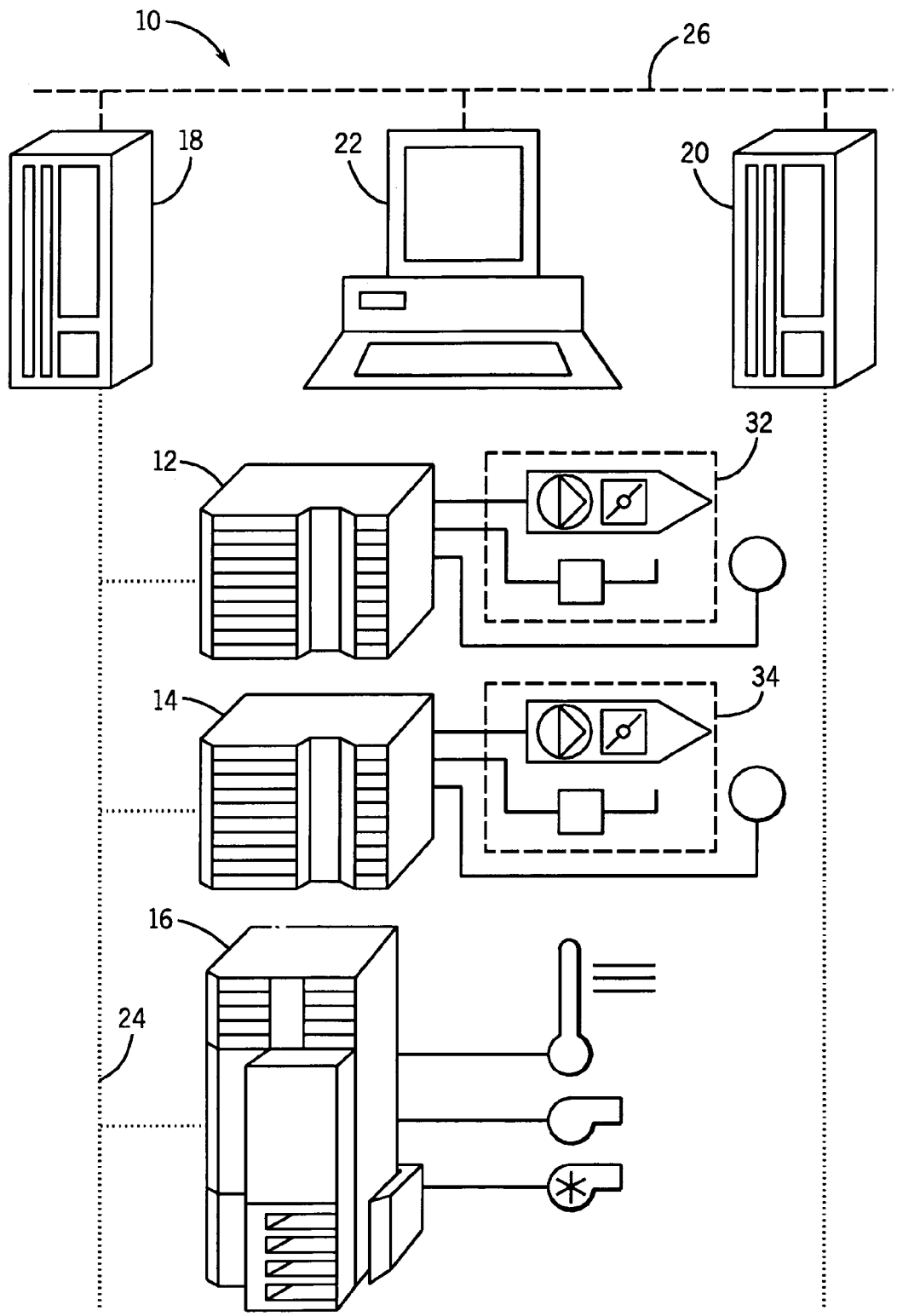
FIG. 1 is a schematic block diagram of an environmental control network.

Before explaining several exemplary embodiments of the present invention in detail it is noted that the invention is not limited to the details of construction or the arrangement of components set forth below or illustrated in the drawings. The invention is capable of other embodiments and being practiced or carried out in various ways. It is also noted that the phraseology and terminology employed herein is for purposes of description only and should not be regarded as limiting.

DETAILED DESCRIPTION OF THE EXEMPLARY EMBODIMENTS

The particulars shown herein are by way of example and for purposes of illustrative discussion of the embodiments of the present invention only and are presented in a manner that is believed to provide the most useful and readily understood description of the principles and concepts of the present invention. In this regard, no attempt is made to show structural details of the present invention in more detail than is necessary to provide a fundamental understanding of the present invention. The description of the invention taken with the drawings is believed sufficient to make it apparent to those skilled in the art how several forms of the present invention may be embodied in practice.

Figure 3:
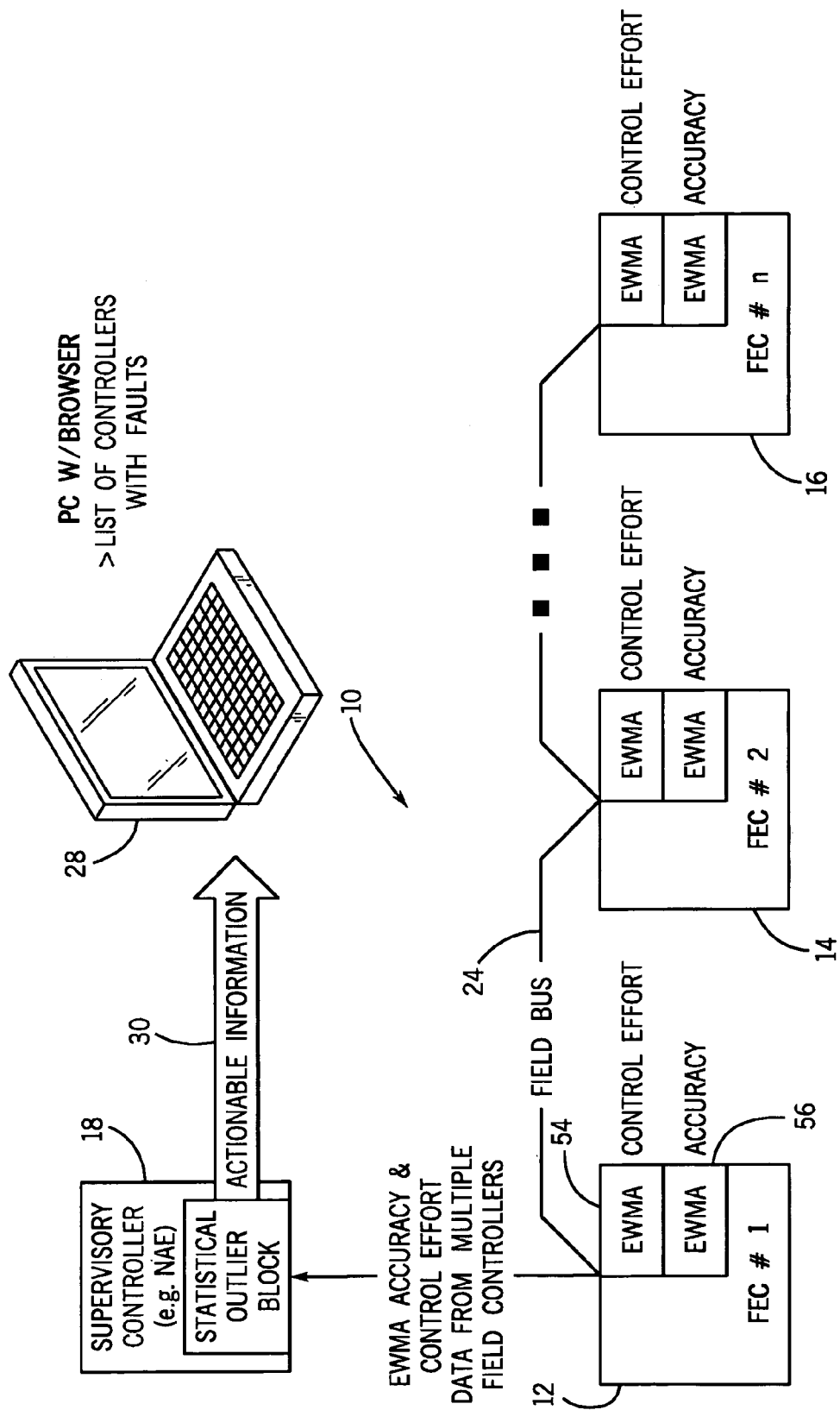
FIG. 3 is simplified schematic block diagram of an environmental control network and a remote computer in communication therewith.

Turning now to the drawings and referring initially to FIG. 1, an environment control system or network 10 includes a plurality of field controllers 12, 14 and 16, a pair of supervisory controllers 18 and 20, and a work station 22. Field controllers 12, 14 and 16 may be coupled to each other and to supervisory controller 18 for communication via a communication bus 24. Supervisory controller 18 may also be coupled to work station 22 as well as to controller 20 or other controllers in environment control network 10 via a communications trunk 26. As shown in FIG. 3, a portable or remote computer 28 may also be coupled to supervisory controller 18, to another controller or server on network 10, and/or to one or more devices on the subnetworks of network 10, via a session connection 30. Session connection 30 may be provided via a local area network (LAN) connection, a remote Internet, VPN connection, etc.

Referring again to FIG. 1, environment control network 10 may be a facilities management system such as the Metasys™ system as manufactured by Johnson Controls, Inc. (JCI). In the illustrated embodiment, field controllers 12 and 14 are associated with VAV boxes 32 and 34 and field controller 16 is associated with an air handler unit (not shown) that provides forced air for the facility. Examples of field bus controllers that may be suitable for use in network 10 include FEC, AHU, VAV, UNT and VMA controllers manufactured by JCI. Examples of supervisory controllers that may be suitable for use in network 10 include NCE, NAE, NIE and NCM controllers manufactured by JCI. Examples of communications buses or trunks that may be suitable for use in network 10 include Ethernet, LON, N1, N2 and MSTP. Persons skilled in the art will recognize that many other types of controllers and communication buses could be utilized in the exemplary embodiments.

According to one exemplary embodiment, each of field controllers 12, 14 and 16 gathers and stores information associated with operation of the controlled devices. Each field controller 12, 14 and 16 may also calculate performance indices (or indicators) for the controlled devices and/or the applications controlling such devices. Performance indicators are attributes of facility components (e.g. buildings, systems, and devices) that measure some aspect of the quality of operation of these components. In general, performance indicators have the following properties:

1. Provide a measure of the quality of the operation of a component, process or system.
2. Capable of being summarized or aggregated in some way.
3. Allow for comparison and summarization among disparate components.
4. May be compared against past performance or benchmarks.

Thus, a performance indicator provides some measure of whether a control application is performing as required. For example, an HVAC control loop controlling some HVAC process variable such as temperature or pressure is designed to maintain the process variable at a setpoint with minimal effort. Good performance indicators for this process might measure the deviation of input (i.e., the process variable) from setpoint (i.e., accuracy) as well as the size (i.e., magnitude, amount or degree) of control effort, which may be indicative of efficiency and/or mechanical wear.

Figure 2:
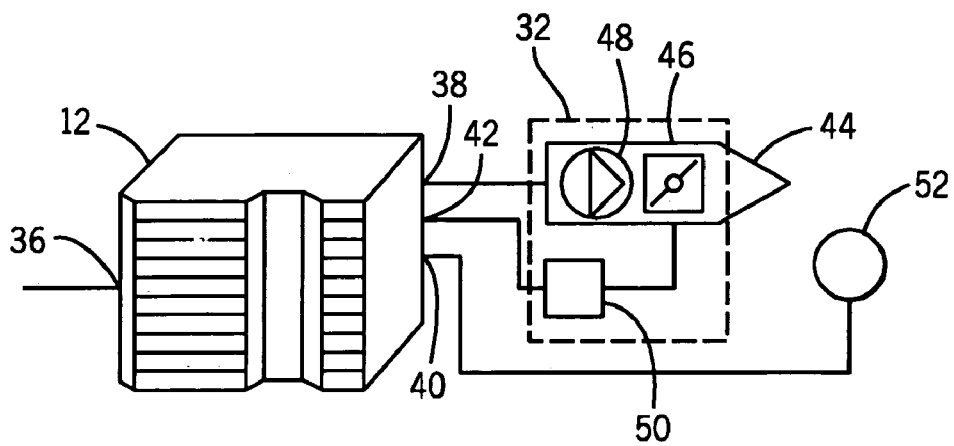
FIG. 2 is an enlarged schematic block diagram of a controller and associated air handling unit shown in FIG. 1.

With reference now to FIG. 2, additional details are provided for an exemplary controller and associated VAV box (e.g., controller 12 VAV box 32) that are suitable for use in the exemplary embodiments. In the illustrated embodiment, controller 12 includes a communication port 36 coupled with communication bus 24 (FIG. 1). Controller 12 also includes an airflow input 38, a temperature input 40, and an actuator output 42. Instead of VAV box 32, the controlled device could be an AHU including fans, heating or cooling units, exhaust dampers, and return dampers for treating an air flow 44.

In the illustrated embodiment, VAV control box 32 includes a damper 46, an air flow sensor 48, and an actuator 50. Actuator 50 positions damper 46 based on control signals from controller 12 provided via actuator output 42. The position of damper 46 controls the amount of air flow 44 provided to the environment being controlled. The controlled environment may be a room, hallway, building, a portion thereof, or any other internal environment. Air flow sensor 48 provides a parameter such as an air flow measurement to air flow input 38 of controller 12. The air flow measurement represents an estimate of the amount of air flow 44 provided through damper 46 to the controlled environment. A temperature sensor 52 located in the controlled environment provides another parameter to controller 12 via temperature input 40.

Additional details regarding controller 12 and its manner of operation are provided in commonly owned U.S. Pat. No. 5,682,329, which was incorporated by reference above. However, a brief summary of certain aspects of the operation of controller 12 are repeated below for convenience. Further details regarding the operation of network 10 are also provided in the '329 patent.

In the embodiment of FIGS. 1 and 2, controller 12 is configured to appropriately position actuator 50 in accordance with a control algorithm. The control algorithm may be a type that is well known to persons skilled in the art such as P, PI, PID based algorithms. The control algorithm may also be a PRAC based algorithm such as disclosed in commonly owned U.S. patent application Ser. No. 10/612, 621 (now U.S. Pat. No. 6,937,909). In accordance with any of these types of algorithms, controller 12 may receive air flow and temperature feedback values at inputs 38 and 40, respectively. The control algorithm may also receive other data (e.g., temperature set point from a thermostat) from communications port 36 or some other input. Controller 12 provides an actuator output signal at actuator output 42 to accurately position damper 46 in an effort to maintain the controlled environment within a specified tolerance of the desired temperature with minimal effort.

In accordance with the foregoing control algorithms, controller 12 may also calculate and store one or more diagnostic and/or performance indices. The calculation of exemplary performance indices by controller 12 is described in the '329 patent, which was incorporated by reference above. Exemplary performance indices may include parameters such as the absolute value error for temperature, pressure, airflow or humidity. Exemplary performance indices may also include the actual temperature measured by temperature sensor 52 or air flow measured by sensor 48, the change in the actuator position signal, the temperature setpoint provided by the thermostat, the duty cycle or run time of actuator 50, or the number of starts, stops and reversals of actuator 50. In addition to the foregoing, many other types of performance indicators could be generated by controller 12, depending on the type of equipment being controlled, the environment being controlled and other factors.

In the embodiment illustrated in FIG. 3, controller 12 may calculate weighted averages of control effort and accuracy performance indicators 54 and 56. Performance indicators 54 and 56 may be exponentially weighted moving averages (EWMAs) such as described in the '329 patent. The calculated EWMA values 54 and 56 may be utilized in a variety of control and diagnostic systems including chemical applications, flight control, energy systems, lighting systems, and other environments. The use of EWMA values (as opposed to only the raw sensor readings) provides certain advantages including that only one previous value must be stored for each performance indicator. Additional advantages of using EWMA values include that they are based on all of the values in the time series, while at the same time being computationally efficient and giving greater weight to more recent values compared to older values.

Controller 12 may store the summary data, the performance indicators and/or the EWMA values in a local memory. Alternatively, or in addition, controller 12 may provide such information to supervisory controller 18 and/or to one or more remote computers 28 (or to any other computer or device on network 10 or that is capable of connecting to network 10) on a continuous, periodic, or on request only basis. This may be done for various purposes such as report generation, data logging, performance monitoring, diagnostics, and the like.

With reference now to FIGS. 4–7, a performance assessment and diagnostics display 58 for a facility management system is provided according to a first exemplary embodiment. Performance display 58 allows an operator to view the summary data, performance indices, EWMA values, and other types of operational data. As explained in detail below, the display of such information may be used to assess the current performance of the facility management system, to detect problems with performance, to diagnose the root causes of the problems, and so on. Significantly, such performance assessment and diagnosis may be accomplished according to the exemplary embodiments without requiring the operator to set any alarm or warning thresholds.

Figure 4:
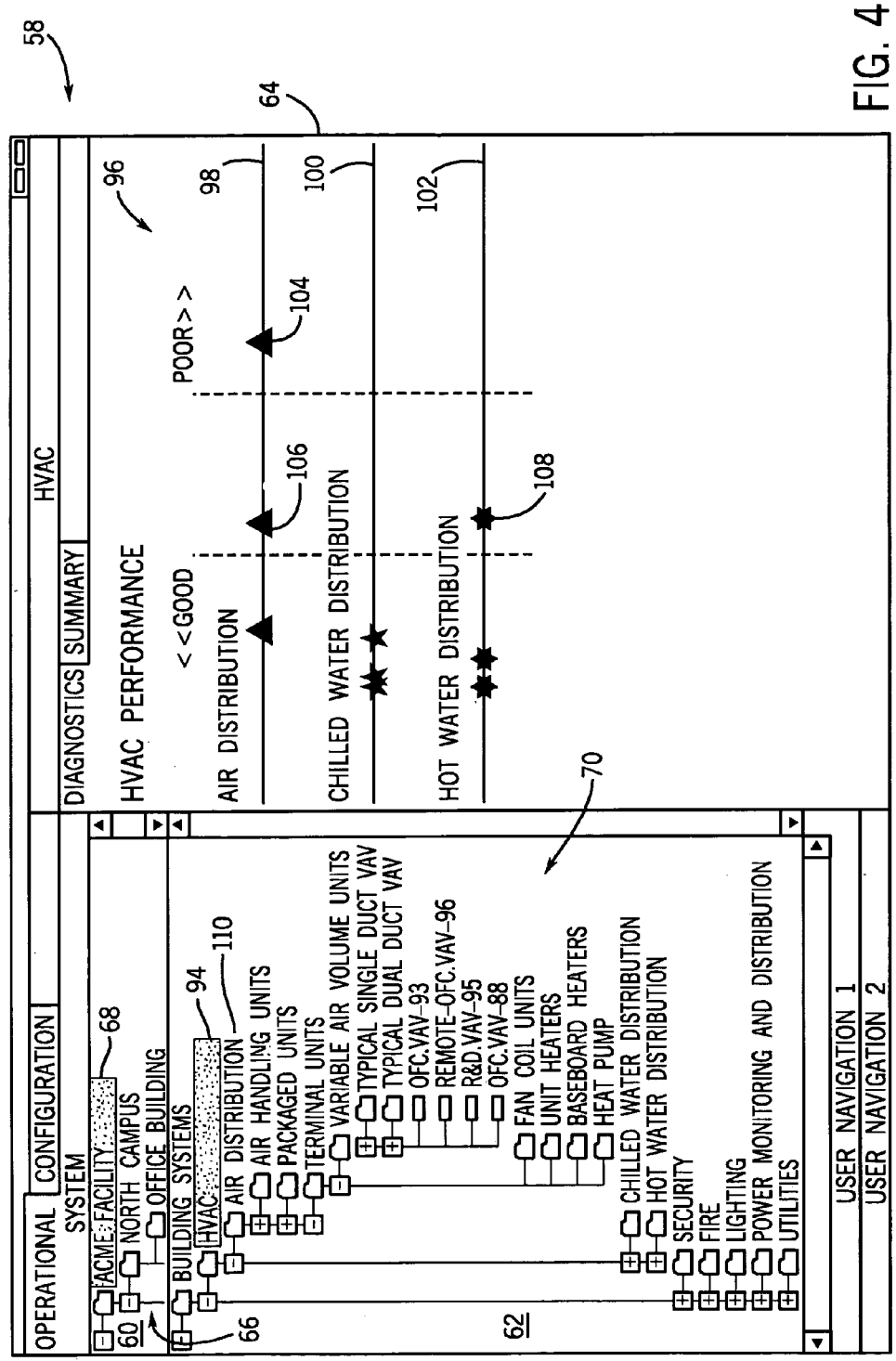
FIGS. 4–7 illustrate a first embodiment of a performance assessment and diagnostics display showing varying levels of detail of performance indicators associated with controlled devices in an environmental control network.

As shown in FIG. 4, performance display 58 comprises three main sections or windows including a facility navigation window 60 (in the upper left), a systems navigation window 62 (in the lower left), and a performance/diagnostics window 64 (on the right). Facility navigation window 60 displays a facility navigation tree 66 that allows an operator to select which of the different facilities and/or subfacilities (e.g., buildings or groups of buildings) of an organization will have its performance assessed and/or diagnosed. In the illustrated embodiment, a root node 68 (labeled "ACME Facility") of facility tree 66 has been selected. As a result of this selection, all of the facilities and subfacilities of ACME Facility 68 are available in systems navigation window 62.

Systems navigation window 62 includes a systems navigation tree 70 that allows an operator to select which of the different systems or subsystems (e.g., equipment, controlled devices, control applications, etc.) of the selected facilities or subfacilities are included in performance/diagnostics window 64. In the embodiment of FIG. 4, a node 94 (labeled "HVAC") of systems tree 70 has been selected. The act of selecting of HVAC node 94 in window 62 causes an HVAC performance view 96 to appear in performance/diagnostics window 64.

In FIG. 4, HVAC performance view 96 provides a high level (i.e., summarized or "rolled-up") view of the performance indicators associated with the selected HVAC systems. According to an exemplary embodiment, HVAC performance view 96 comprises a plurality of "dot plots" graphs of the performance indices for the selected HVAC systems. For example, HVAC performance view 96 may include a dot plot graph for each type of control loop used in the HVAC systems of ACME Facility 68. In the illustrated example, view 96 displays an air distribution dot plot 98, a chilled water distribution dot plot 100, and a hot water distribution dot plot 102. That is, dot plots 98, 100 and 102 in FIG. 4 display performance indicators associated with the current level of performance for the air distribution, chilled water distribution and hot water distribution control loops in the HVAC systems of ACME Facility 68.

Instead of dot plot graphs, HVAC performance view 96 could display the performance indices for the selected HVAC systems using other types of graphics such as histograms, box plots, and the like. Moreover, the performance indicators could be displayed using a textual based display such as a table with rows and columns of numbers or percentages, or by a combination of graphics and text.

In the illustrated example, dot plot 98 in view 96 indicates that two of the air distribution control loops (indicated by data plots 104 and 106) are currently experiencing something less than good performance, with data plot 104 indicating a control loop considered to be operating at a "poor" level. By contrast, dot plots 100 and 102 show that all of the chilled water distribution control loops and all but one of the hot water distribution control loops are currently exhibiting good performance. In dot plot 102, one hot water distribution control loop shown in summary view 96 appears to be experiencing somewhat degraded system performance (see data point 108).

According to an exemplary embodiment, summary view 96 is created by rolling-up the performance indicators for only the worst performing control loop or subsystem of the selected system. Thus, the performance indicators for control loops or subsystems that are performing better than the worst performing control loops or subsystems may not be shown in summary view 96. As persons skilled in the art will appreciate, this summary view allows building operators to quickly identify control loops or subsystems that are exhibiting degraded performance levels without being distracted by control loops or subsystems that are performing properly. Instead of displaying performance indicators for only the worst performing control loops or subsystems, a weighting function or some other technique may be utilized.

Whenever a control loop or subsystem is identified using summary view 96 as performing at a degraded level, system tree 70 can be used to delve further into the performance indices associated with the poorly performing control loop or subsystem to obtain additional information which may help to diagnose the root cause of the degraded performance.

In view 96, a building operator responsible for diagnosing problems in the HVAC systems of ACME Facility 68 will notice that the air handling unit represented by data plot 104 appears to be experiencing degraded performance. To find the reason for this poor performance, the building operator may select a node 110 (labeled "Air Distribution") in system tree 70 to obtain additional information on the air distribution units.

Figure 5:
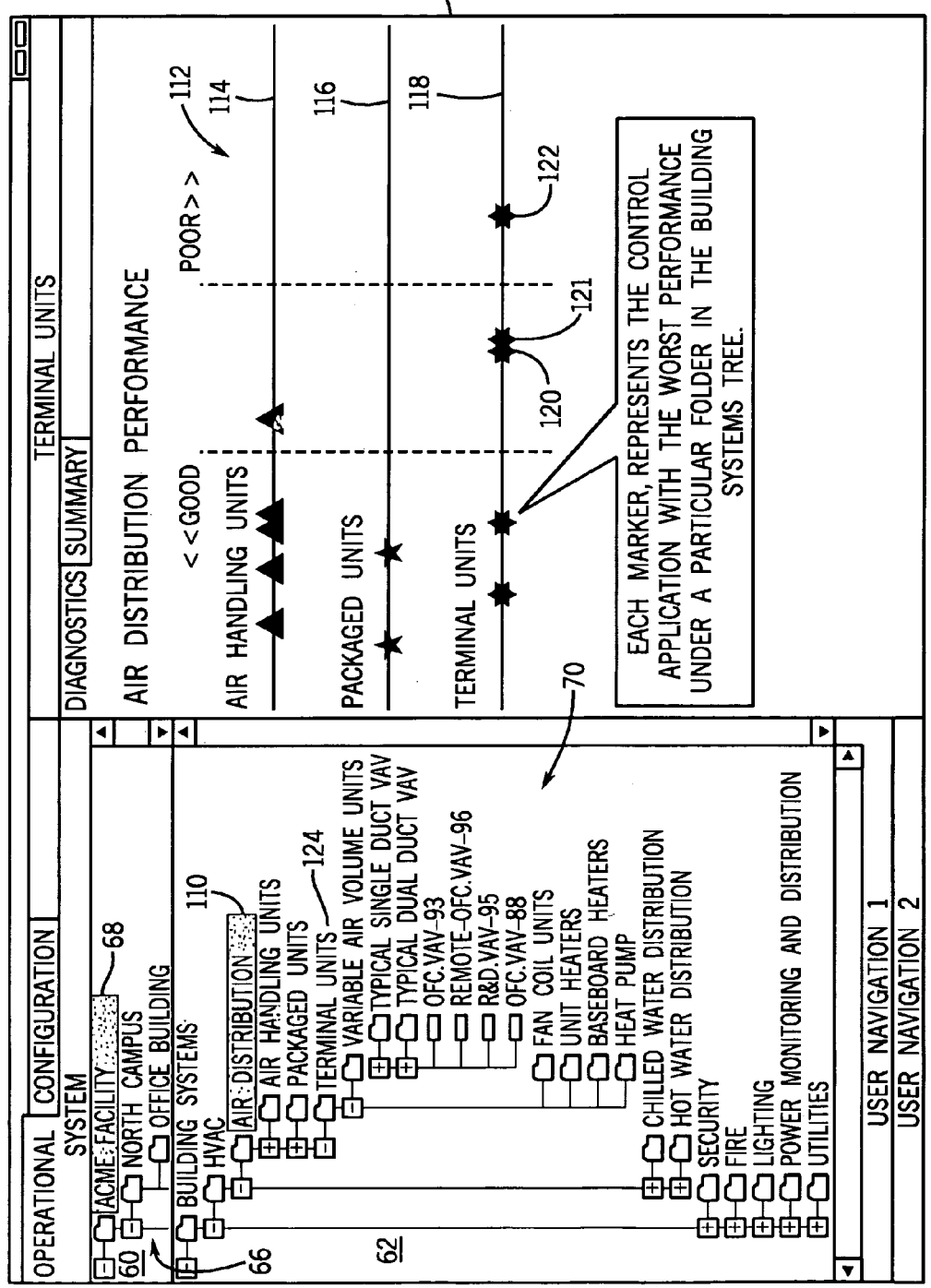

As shown in FIG. 5, the selection of node 110 in tree 70 causes an air distribution performance view 112 to appear in performance/diagnostics window 64. View 112 displays performance indices for all of the air distribution systems in ACME Facility 68 using dot plots graphs, one for each of type of air distribution system. For example, view 112 may display performance indices for air handling units, packaged units and terminal units in dot plots 114, 116 and 118, respectively.

From the performance indicators displayed in view 112, and particularly data points 120, 121 and 122 in dot plot 114, it can be seen that the poor air distribution performance first observed in summary view 96 (see data point 104 in FIG. 4) is associated with the terminal units rather than the air handling units or packaged units of the HVAC systems of in ACME Facility 68. Additional information for diagnosing the poor performance of the terminal unit(s) may be obtained by selecting a node 124 (labeled "Terminal Units") in system tree 70 of window 62.

Figure 6:
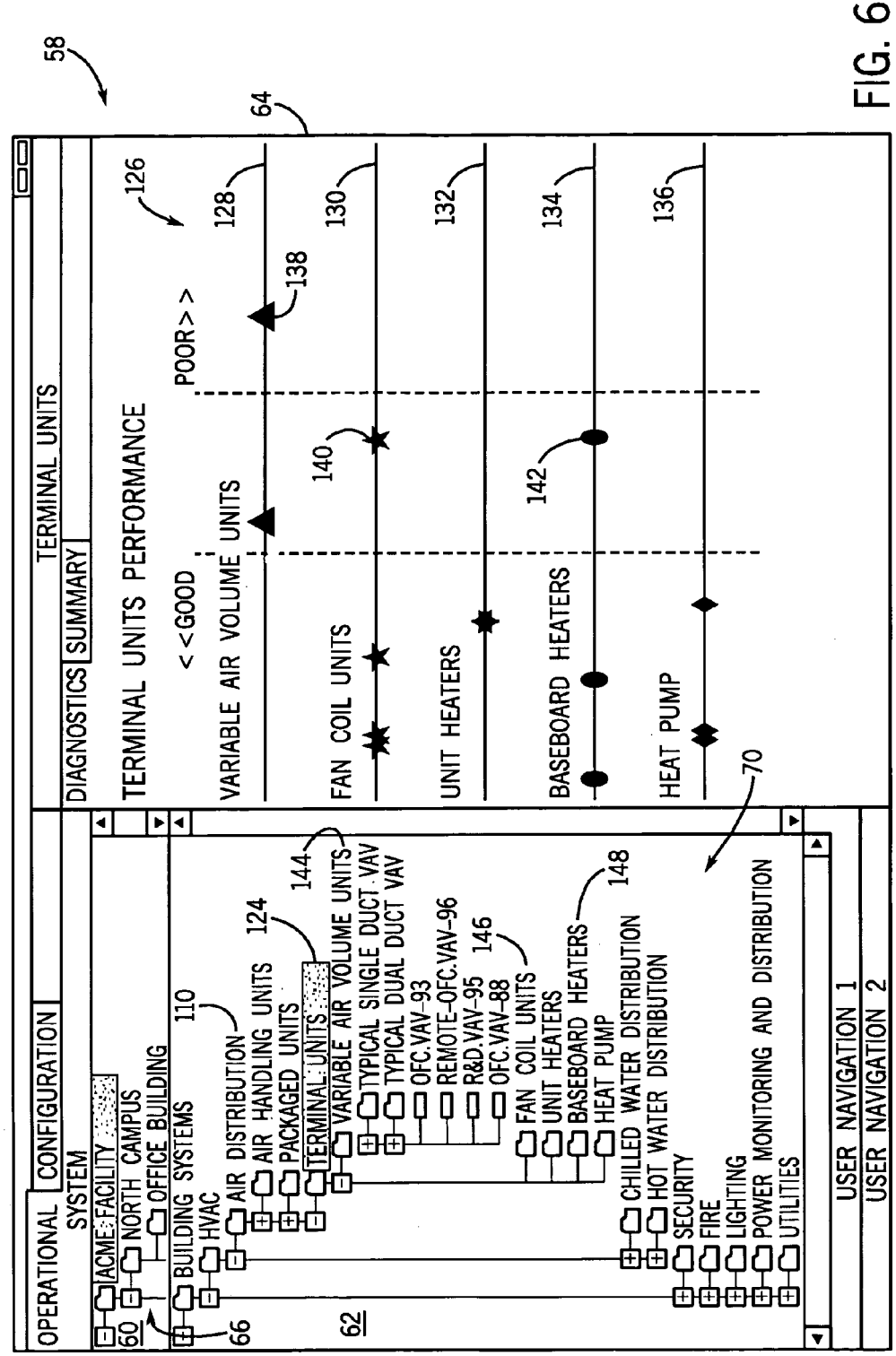

When node 124 is selected, a terminal units performance view 126 appears in performance/diagnostics window 64 as shown in FIG. 6. View 126 shows performance indicators for all of the terminal units in ACME Facility 68 using dot plots, one for each type of terminal unit in ACME Facility 68. In the illustrated embodiment, view 126 displays performance indices in dot plots 128, 130, 132, 134 and 136 corresponding to variable air volume units, fan coil units, unit heaters, baseboard heaters and heat pumps, respectively.

Figure 7:
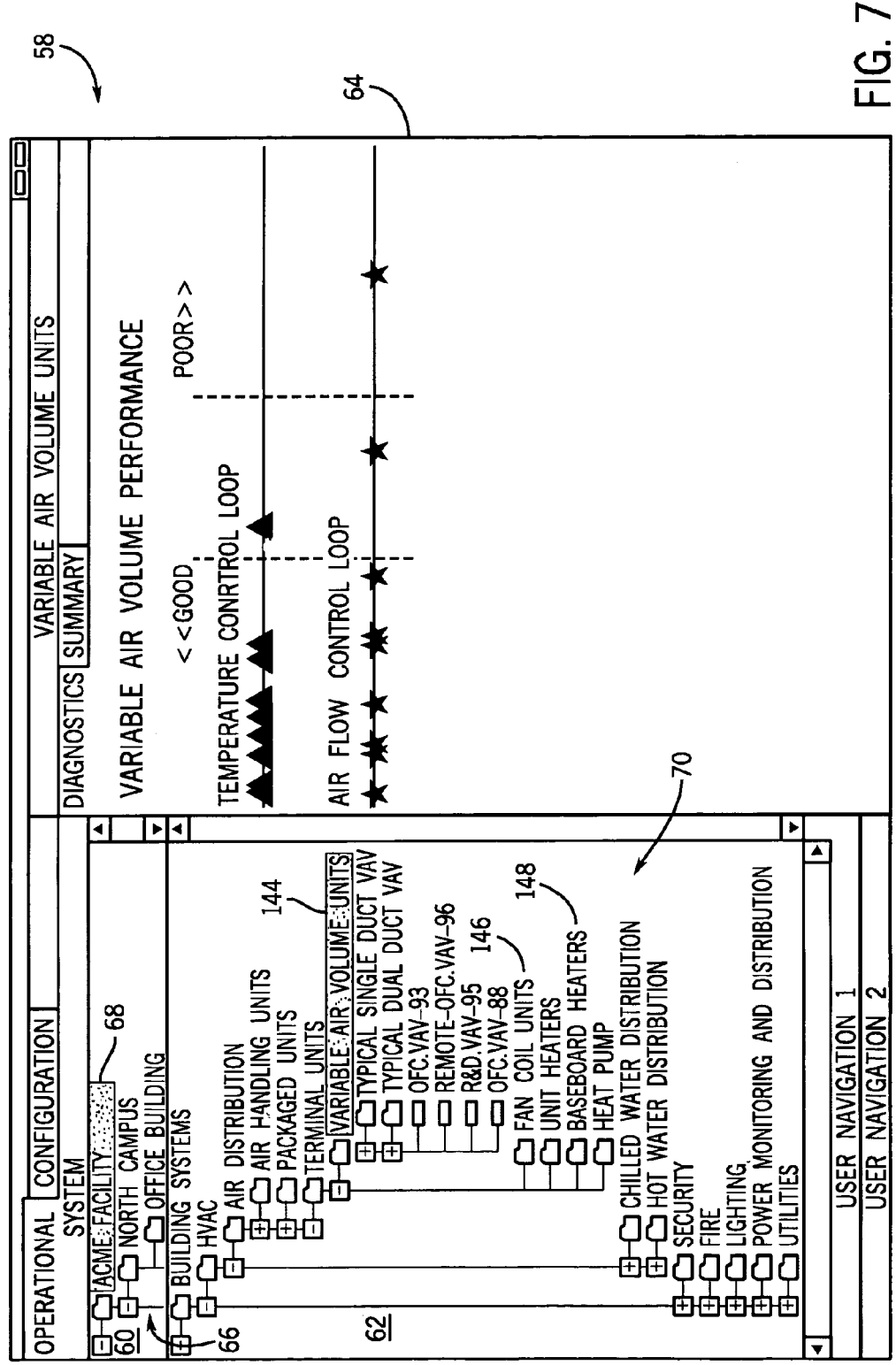
Figure 8:
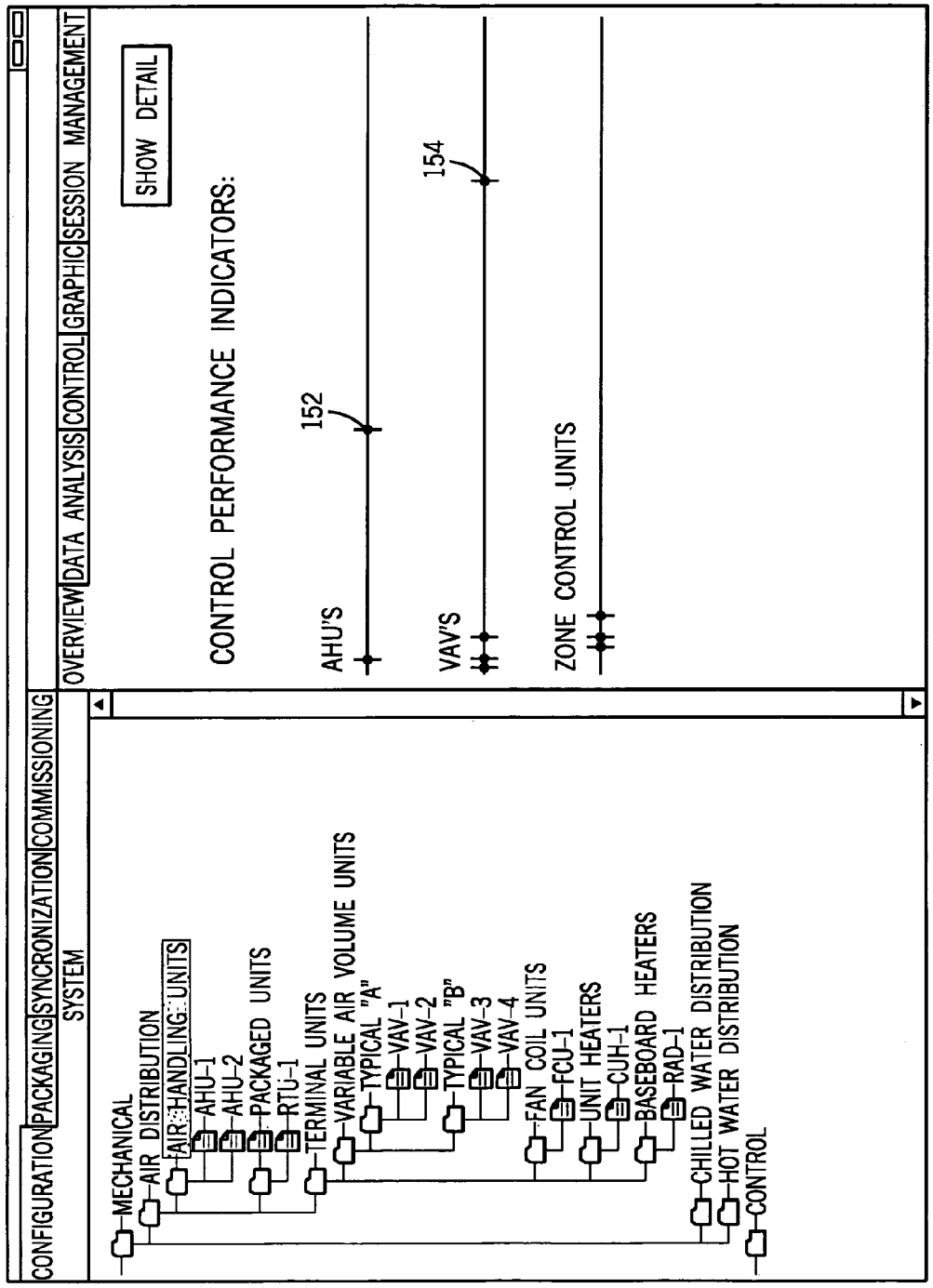
FIGS. 8–10 illustrate different reports displaying varying levels of detail of performance indicators associated with controlled devices in an environmental control network.

From the performance indicators displayed in view 126, and particularly dot plot 128, it can be seen that one of the variable air volume units (represented by data point 138) is experiencing particularly poor performance. Additional information regarding the degraded performance of this variable air volume unit indicated by data point 138 may be obtained by selecting a node 144 (labeled "Variable Air Volume Units") in system tree 70 of window 62 as shown in FIG. 7. Although not shown, nodes 146 and/or 148 can be selected to obtain additional information regarding the degraded fan coil unit performance and baseboard heater performance indicated by data plots 140 and 142, respectively.

As persons skilled in the art will appreciate, the above-described embodiment of the present invention provides a new methodology for fault detection and diagnosis that overcomes many of the problems with traditional methods. Currently, fault detection is typically accomplished using alarm and event management systems that are based on limit sensing. Limit sensing raises alarms when observations cross predefined thresholds. After the alarm draws the operator's attention, the operator must typically find the root cause of the alarm without any further assistance from the alarm and event management system. Limit sensing is prevalent in current systems because it easy to implement and understand, however, it has limitations. For example, it can be difficult to set thresholds that minimize false alarms while still being sensitive to real faults. Moreover, certain kinds of faults tend to cascade alarms, making it more difficult for the operator to focus on the true root cause.

To further explain the methodology associated with the present invention, it is useful to identify the various stages in fault detection and diagnosis in building automation system monitoring. In general, there are three stages to fault detection and diagnosis in engineering systems:

1. Fault detection—determine that something has or is going wrong in the monitored system.
2. Fault isolation—determine the exact location of the fault (i.e., the faulty component(s) such as valve, damper, etc.).
3. Fault identification—determine the magnitude of the fault.

The isolation and identification tasks together are referred to as fault diagnosis.

The methodology and framework of the exemplary embodiments described herein assists with the first four stages. In particular, the use of performance indicators automates stages 1 and 2. In addition, the standard user interface for organizations, navigations, performance indicator alarm reporting, and views provided by display 58 assists users with stages 3 and 4.

With reference now to FIGS. 8–12, a typical scenario for using another exemplary embodiment of the present invention for performance based commissioning and/or long term monitoring of an HVAC system will be described. Performance based commissioning and/or long term monitoring begins with an overview report 150 (see FIG. 8) that shows all of the systems that have been or are currently being assessed. That is, report 150 summarizes the performance of all systems that are being commissioned or monitored. Note that only certain systems are identified as poor performers (as indicated by data points 152 and 154).

Figure 9:
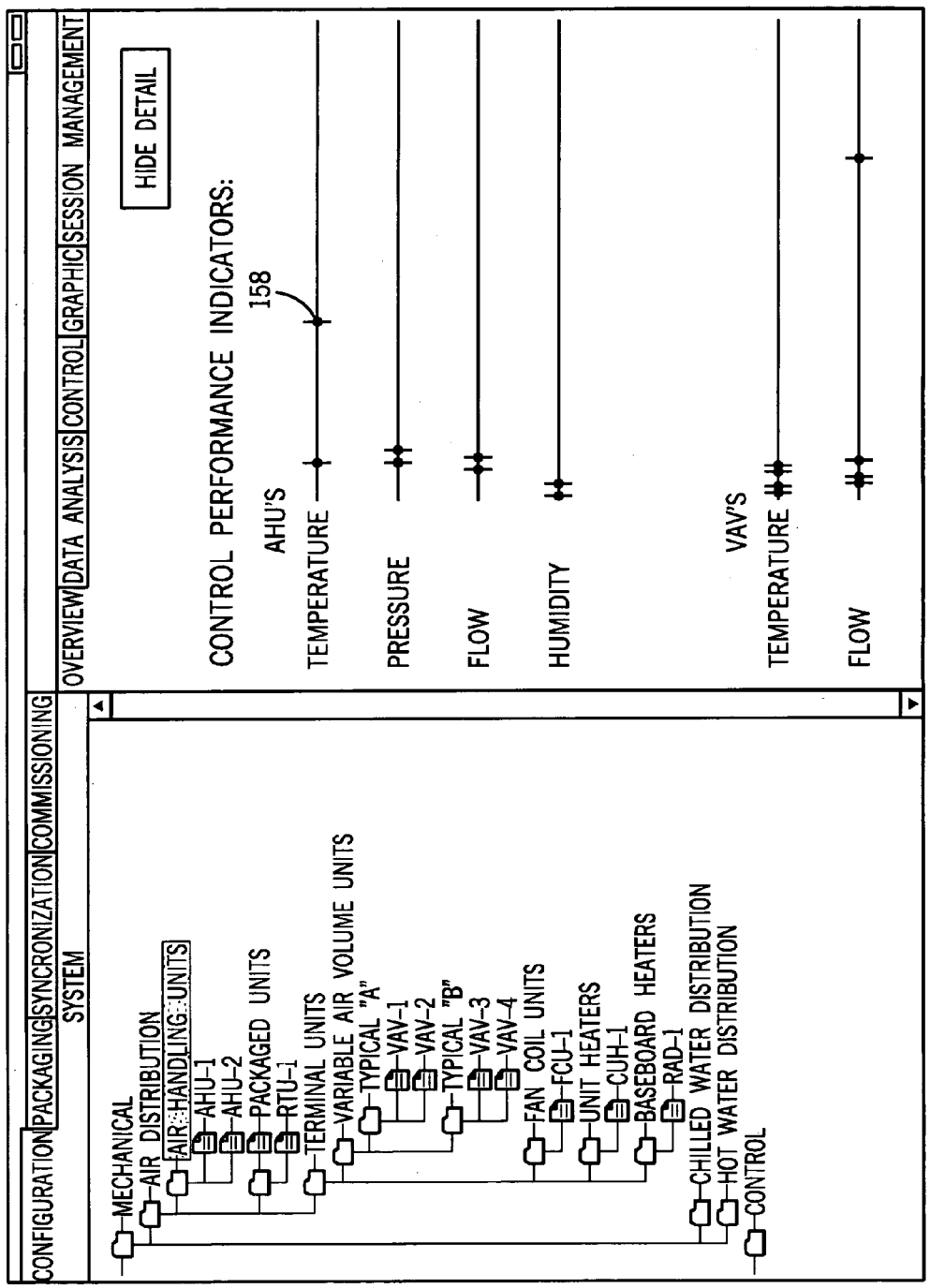

When poorly performing systems are identified, the user is able to drill down on the poorly performing systems using the illustrated apparatus to discover additional details that may assist the user with diagnosing the root cause of the poor performance. For example, FIG. 9 shows a first level of drill down by system type in a report 156. Report 156 shows the performance of HVAC control loops within each of the systems types. This level of drill down allows the user to identify the specific kind of problem a system is having.

Figure 10:
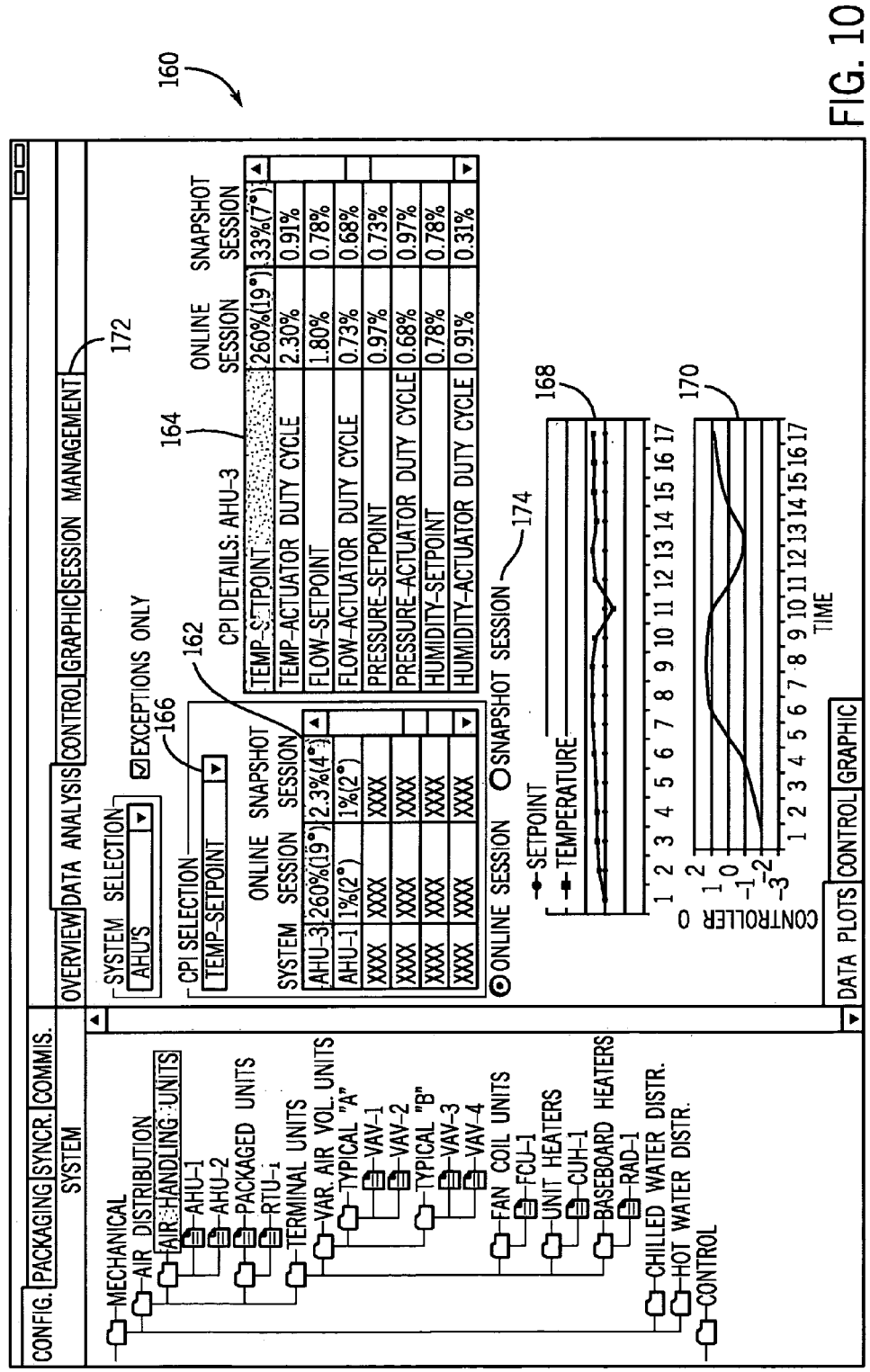

After the control loop having the problem is identified (e.g., the temperature control loop indicated by data point 158 in FIG. 10), the user is able to zoom in on the performance of the individual control loop using a report 160 (see FIG. 10). According to an exemplary embodiment, report 160 displays enough trend data or historical sensor information to allow problems with the performance to be diagnosed. In the illustrated embodiment, report 160 includes tables 162 and 164 which display performance data for the control loops. According to an exemplary embodiment, the user can select a row in table 162 to cause table 164 to provide the detailed information for the control loop associated with the air handling unit of the selected row in table 162 and a drop down menu 166. At the same time, a pair of graphs 168 and 170 display actual values (both historical and current) from a trend buffer for the selected control loop which may allow the user to visually identify performance problems. For example, in a temperature control loop for AHU-3 there is an input, a set point, and an output. Thus, all three of such values can be plotted in graphs 168 and 170 to help the user diagnose the problem.

According to an exemplary embodiment, the data in the trend buffer along with any other gathered historical data and/or performance indicators may be stored for future reference in a database or other memory by clicking on a session management tab 172 and activating a save feature. In addition, a snapshot session checkbox 174 may be provided to allow any previously saved session data to be redisplayed in tables 162 and 164 and in graphs 168 and 170.

Figure 11:
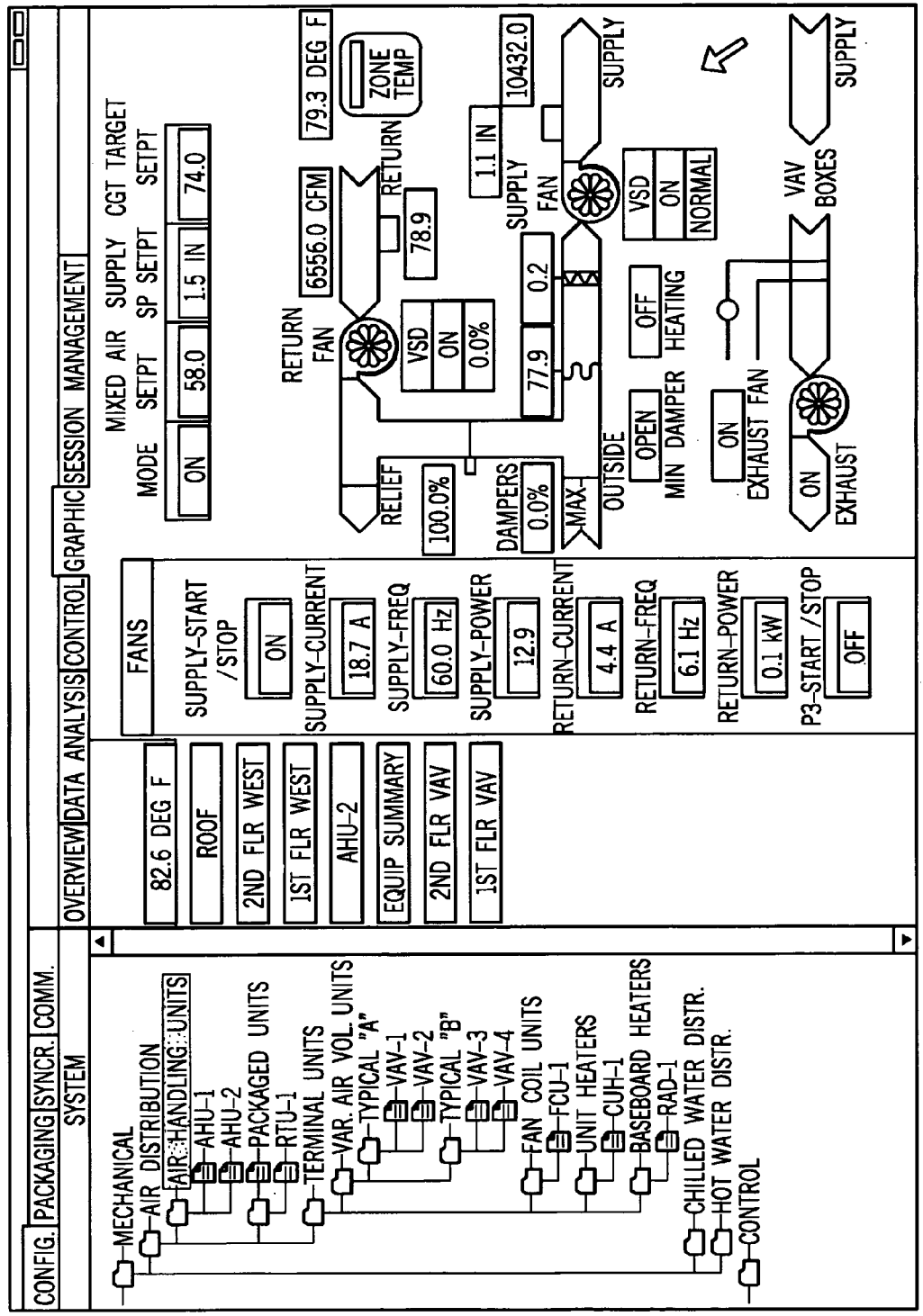
FIGS. 11 and 12 illustrate tools that may be used to inspect and alter values and control logic associated with controlled devices in an environmental control network.
Figure 12:
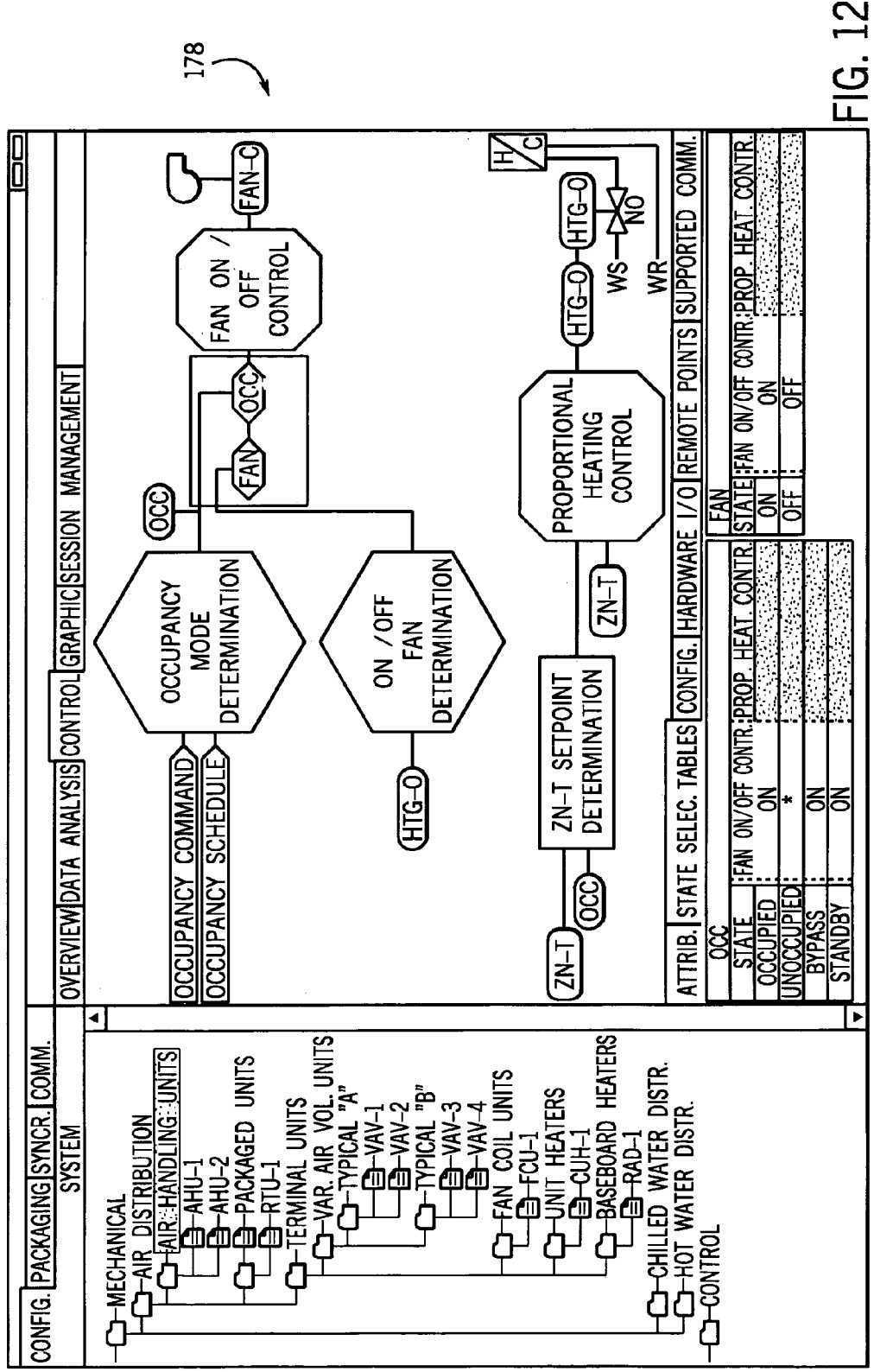

Turning now to FIGS. 11 and 12, two final tools for assessing performance and diagnosing problems in a facility management system are provided. FIG. 11 displays a hardware (or mechanical) system layout view 176 for the selected system. View 176 provides a simplified view of the selected system (at a device level detail) and the values presently on that system based on the graphic. Using view 176, it is possible to not only inspect values in the system but also to override and change the values. This can be invaluable in assisting building operators with diagnosing problems noted in higher level performance views of the system.

FIG. 12 shows a control diagram view 178 which illustrates the control strategy used for the selected system (e.g., volume matching vs. building static pressure control for the return fan). View 178 may be used for many purposes that might benefit building operators such as verifying sequence of operation, creating building wide control strategies (e.g., optimal start, power-fail, motor restart), and the like. View 178 may also be used to override values (either temporarily or permanently) to perform testing and/or diagnosis of problems.

Figure 13:
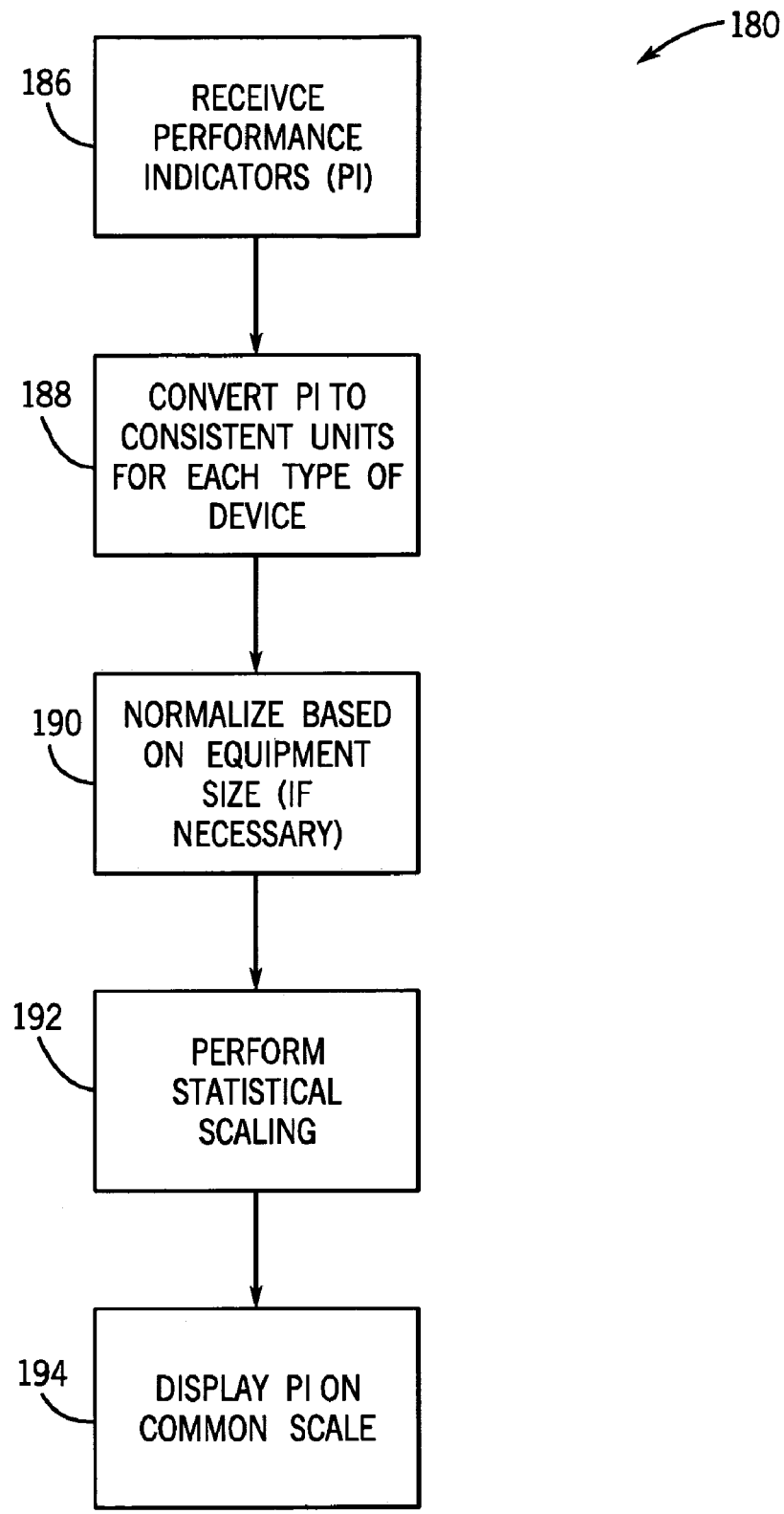
FIG. 13 illustrates a flowchart of an exemplary embodiment of a method for generating a normalized/scaled performance graph.

Turning now to FIG. 13, an exemplary embodiment of a method 180 for creating a normalized/scaled performance view 184 (see FIG. 14) is illustrated and described. According to method 180, performance indicators ("PI") are received in a step 186 for one or more control applications.

After the performance indicators are received, the performance indicators are converted in a step 188 into consistent units for each type of control application. For example, the airflow through one VAV box may be measured in cubic feet per minute (CFM) while in another VAV box it is measured in cubic feet per second.

Next, the standardized performance indicators may be normalized based on the equipment size in a step 190. Normalization step 190 need only be performed in certain instances, e.g., for volumetric or mass flow rates. For example, it may be necessary to normalize flow errors in a VAV box because an error of 100 CFM is a large error for a box with a maximum capacity of 200 CFM but a small error for a box with a maximum capacity of 100,000 CFM. Examples of volumetric flow rates performance indices that might benefit from normalization include (1) the absolute value of flow error through a VAV box and (2) the absolute value of return flow error for volume matching. An exemplary method for normalizing such flow rates for volumetric flow rate is to divide the performance index by the design or maximum capacity. For example, if a VAV box has a control performance index for the absolute value of the flow error of 100 CFM and the maximum capacity of the box is 1,000 CFM, then a normalized performance index may be 0.1 (i.e., 100 CFM/1,000 CFM). Other types of performance indices besides volumetric or mass flow rates may also require and/or benefit from normalization. Examples of performance indices that typically need not be normalized include pressure, temperature, humidity, velocity, and the like.

After obtaining standardizing and normalizing (where necessary or helpful) the performance indices, a statistical scaling is performed in a step 192. An exemplary method for performing such statistical scaling involves determining the standard deviation (z-value) for each performance index. The standard deviation score is a measure in standard deviations of how far a sample is from the mean. The standard deviation score is determined from the following equation:

$$z_x = \frac{X - \overline{X}}{s}$$

where X is the performance index, $\overline{X}$ is the mean of the performance index for fault-free systems, and s is the sample standard deviation for fault-free systems.

Figure 14:
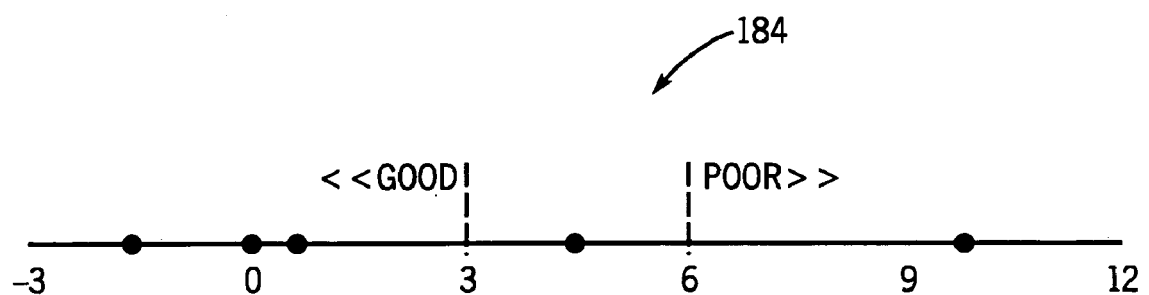
FIG. 14 illustrates a standardized/normalized/scaled performance graph.

In the illustrated embodiment, method 180 concludes with a final step 194 of displaying each standardized/normalized/scaled Pi on a common scale. One example of a common scale is shown in FIG. 14. In this scale, the standard deviation score for each performance index is plotted as a dot on a continuum between −3 and 12. In this example, the scale ranges from −3 standard deviations (representing extremely good performance) and 12 standard deviations (representing exceptionally poor performance). Other types of common scales are well known to persons skilled in the art and could also be utilized.

As persons skilled in the art will appreciate, the forgoing methods, apparatuses and tools enable multi-site organizations to centrally manage the performance of their building systems and equipment across the breadths of their enterprises. Moreover, the foregoing methods and apparatuses apply to not only to HVAC systems (e.g., chillers, boilers, air handlers), but also to other types of controlled systems.

It is understood that, while the detailed drawings and specific examples given describe exemplary embodiments of the present invention, they are for the purpose of illustration only. The invention is not limited to the precise details and conditions disclosed. For example, although the forgoing exemplary embodiments were described more thoroughly in the context of an HVAC system than other types of environmental control systems, the concepts of the present invention are equally applicable to numerous other types of systems including but not limited to lighting, utilities, spaces, fire and safety, power and the like. Also, although particular facility management systems and components are suggested, the performance monitoring and diagnostic system may be configured for various other HVAC systems. In addition, the system may easily be configured to analyze other performance indicators than those specifically described or mentioned above. Accordingly, these and all other such modifications are intended to be included within the scope of the present invention. Other substitutions, modifications, changes and omissions may be made in the design, operating conditions and arrangement of the exemplary embodiments without departing from the spirit of the present invention.

What is claimed is:

1. A method for analyzing performance of control applications in an environmental control network, comprising:
   receiving at least one performance indicator for each control application;
   identifying at least one control application experiencing degraded performance using a first view of the performance indicators; and
   obtaining additional information regarding the at least one control application using a second view of the performance indicators.

2. The method of claim 1, wherein first and second views each include a plurality of continuums ranging from good to poor performance with the performance indicators plotted on the continuums.

3. The method of claim 2, wherein a different continuum is provided for each type of control application.

4. The method of claim 1, wherein the first view is a summary view of the performance indicators and the second view is a more detailed view of the performance indicators.

5. The method of claim 4, wherein the summary view displays the performance indicators for only a worst performing control application among a group of control applications.

6. The method of claim 1, wherein the identifying and obtaining steps are performed by navigating at least one tree structure.

7. The method of claim 1, wherein the control applications are associated with an HVAC system.

8. The method of claim 1, wherein the performance indicators represent control effort and accuracy.

9. The method of claim 8, wherein the performance indicators are exponentially weighted moving averages.

10. The method of claim 1, wherein the first and second views each include a plurality of dot plots ranging from good to poor performance.

11. The method of claim 10, wherein a separate dot plot is provided for each type of control application in the first view.

12. The method of claim 10, wherein a separate dot plot is provided for each type of control loop in the control applications in the second view.

13. The method of claim 1, further including displaying trend buffer data for the at least on control application.

14. The method of claim 13, further including saving the trend buffer data for display at a later time.

15. The method of claim 1, further including displaying a mechanical view of the environmental control network.

16. The method of claim 15, wherein the mechanical view allows a user to inspect and alter values in the at least one control application.

17. The method of claim 1, further including displaying a control diagram view of the environmental control network.

18. The method of claim 17, wherein the control diagram view allows a user to inspect and alter a control strategy used for the at least one control application.

19. The method of claim 1, further including using statistical analysis to identify a mean and standard deviation for each performance indicator.

20. The method of claim 19, wherein the mean and standard deviation for each performance indicator are used to plot each performance indicator on a continuum ranging from good to poor.

21. A computer program product for analyzing performance of control applications in an environmental control network, the program product in combination with and embodied on a computer-readable medium and comprising machine-readable program code for causing, when executed, one or more machines to perform the following method steps:
displaying performance indicators for the control applications using a first view that allows at least one control application exhibiting degraded performance to be identified; and
displaying performance indicators using a second view that provides additional details regarding the performance of the at least one control application.

22. The program product of claim 21, wherein first and second views each include a plurality of continuums ranging from good to poor performance with the performance indicators plotted on the continuums.

23. The program product of claim 22, wherein a different continuum is provided for each type of control application.

24. The program product of claim 21, wherein the first view is a summary view of the performance indicators and the second view is a more detailed view of the performance indicators.

25. The program product of claim 24, wherein the summary view shows the performance indicators for only a worst performing control loop for each control application.

26. The program product of claim 21, wherein the program code causes at least one tree structure to be displayed for selecting the first view and the second view.

27. The program product of claim 21, wherein the control applications are associated with an HVAC system.

28. The program product of claim 21, wherein the performance indicators represent control effort and accuracy.

29. The program product of claim 28, wherein the performance indicators are exponentially weighted moving averages.

30. The program product of claim 21, wherein the first and second views each include a plurality of dot plots ranging from good to poor performance.

31. The program product of claim 30, wherein a separate dot plot is provided for type of control application in the first view.

32. The program product of claim 30, wherein a separate dot plot is provided for each type of control loop in the control applications in the second view.

33. The program product of claim 21, wherein the program code causes trend buffer data to be displayed for the at least one control application.

34. The program product of claim 33, wherein the program code causes trend buffer data to be saved for display at a later time.

35. The program product of claim 21, wherein the program code causes a mechanical view of the environmental control network to be displayed.

36. The program product of claim 35, wherein the mechanical view allows a user to inspect and alter values in the at least one control application.

37. The program product of claim 21, the program code causes a control diagram view of the environmental control network to be displayed.

38. The program product of claim 37, wherein the control diagram view allows a user to inspect and alter a control strategy used for the at least one control application.

39. A method for diagnosing performance of control applications in an environmental control network, comprising:
receiving at least one performance indicator for each control application;
identifying at least one control application exhibiting degraded performance using a first view of the performance indicators; and
obtaining additional information regarding the at least one control application using a second view of the performance indicators, the second view providing additional information on the at least one control application to permit a diagnosis of a possible cause of the degraded performance.

40. The method of claim 39, wherein first and second views each include a plurality of continuums ranging from good to poor performance with the performance indicators plotted on the continuums.

41. The method of claim 40, wherein a different continuum is provided for each type of control application.

42. The method of claim 39, wherein the first view is a summary view of the performance indicators and the second view is a more detailed view of the performance indicators.

43. The method of claim 42, wherein the summary view displays the performance indicators for only a worst performing control loop for each control application.

44. The method of claim 39, wherein the identifying and obtaining steps are performed by navigating at least one tree structure.

45. The method of claim 39, wherein the control applications are associated with an HVAC system.

46. The method of claim 39, wherein the performance indicators represent control effort and accuracy.

47. The method of claim 46, wherein the performance indicators are exponentially weighted moving averages.

48. The method of claim 39, wherein the first and second views each include a plurality of dot plots ranging from good to poor performance.

49. The method of claim 48, wherein a separate dot plot is provided for type of control application in the first view.

50. The method of claim 48, wherein a separate dot plot is provided for each type of control loop in the control applications in the second view.

51. The method of claim 39, further including displaying trend buffer data for the at least one control application.

52. The method of claim 51, further including saving the trend buffer data for display at a later time.

53. The method of claim 39, further including displaying a mechanical view of the environmental control network.

54. The method of claim 53, wherein the mechanical view allows a user to inspect and alter values in the at least one control application.

55. The method of claim 39, further including displaying a control diagram view of the environmental control network.

56. The method of claim 55, wherein the control diagram view allows a user to inspect and alter a control strategy used for the at least one control application.

57. The method of claim 39, further including using statistical analysis to identify a mean and standard deviation for each performance indicator.

58. The method of claim 57, wherein the mean and standard deviation for each performance indicator are used to plot each performance indicator on a continuum ranging from good to poor.

* * * * *